US010277840B2

(12) United States Patent
Parks

(10) Patent No.: US 10,277,840 B2
(45) Date of Patent: Apr. 30, 2019

(54) METHODS FOR CLOCKING AN IMAGE SENSOR

(71) Applicant: SEMICONDUCTOR COMPONENTS INDUSTRIES, LLC, Phoenix, AZ (US)

(72) Inventor: Christopher Parks, Rochester, NY (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/143,775

(22) Filed: May 2, 2016

(65) Prior Publication Data
US 2017/0201698 A1    Jul. 13, 2017

Related U.S. Application Data

(60) Provisional application No. 62/277,167, filed on Jan. 11, 2016.

(51) Int. Cl.
*H04N 5/347* (2011.01)
*H04N 5/357* (2011.01)
*H04N 5/3728* (2011.01)

(52) U.S. Cl.
CPC .......... *H04N 5/347* (2013.01); *H04N 5/3577* (2013.01); *H04N 5/3728* (2013.01)

(58) Field of Classification Search
CPC ...... H04N 5/3765; H04N 5/347; H04N 5/372; H04N 5/378; H04N 5/953; H04N 29/765
See application file for complete search history.

(56) References Cited

U.S. PATENT DOCUMENTS

| 3,930,255 | A | 12/1975 | Means | |
|---|---|---|---|---|
| 7,015,520 | B1 * | 3/2006 | Parks | H01L 27/148 257/215 |
| 7,718,944 | B2 * | 5/2010 | Matsuyama | H04N 5/335 250/208.1 |
| 8,164,669 | B2 | 4/2012 | Compton et al. | |

(Continued)

OTHER PUBLICATIONS

"Binning Mode Operation for Full Frame CCD Sensors", ON Semiconductor Application Note, Oct. 2014 (12 pages) [Retrieved on Jan. 11, 2016], Retrieved from the Internet <URL: http://www.onsemi.com/pub_link/Collateral/AND9187-D.PDF>.

*Primary Examiner* — Twyler L Haskins
*Assistant Examiner* — Wesley J Chiu
(74) *Attorney, Agent, or Firm* — Treyz Law Group, P.C.; Joseph F. Guihan

(57) ABSTRACT

A method of binning charges in a charge coupled device (CCD) image sensor is described. The frequency at which an HCCD in the CCD image sensor is clocked may be a multiple of the frequency at which a summing element coupled to the end of the HCCD is clocked, such that charges may be binned at a gate within the HCCD or at the summing element before being read out. The clock signal for the summing element may have a 50% duty cycle in order to provide additional time for charge to flow across an output gate to a floating diffusion node in an output stage of the CCD image sensor. For cases where the HCCD clock frequency is more than twice the summing element clock frequency, charges may be binned at the summing element. Otherwise, charges may be binned at another gate within the HCCD.

13 Claims, 6 Drawing Sheets

(56) References Cited

U.S. PATENT DOCUMENTS

| | | |
|---|---|---|
| 8,306,362 B2 | 11/2012 | Compton |
| 8,692,916 B2 | 4/2014 | Lazovsky et al. |
| 2002/0118291 A1* | 8/2002 | Ishigami .............. H04N 3/1562 348/311 |
| 2004/0210107 A1* | 10/2004 | Tani ....................... A61B 1/042 600/109 |
| 2006/0044441 A1* | 3/2006 | Parks ................. H04N 5/23241 348/322 |
| 2006/0066739 A1* | 3/2006 | Kobayashi ............. H04N 5/335 348/294 |
| 2007/0139545 A1* | 6/2007 | Parks .................... H04N 5/335 348/311 |
| 2007/0280402 A1* | 12/2007 | Otsuru ................... G11C 27/04 377/60 |
| 2008/0239128 A1* | 10/2008 | Kawai ............... H04N 5/37213 348/311 |
| 2014/0078369 A1* | 3/2014 | Morita .................. H04N 5/372 348/311 |

* cited by examiner

METHODS FOR CLOCKING AN IMAGE SENSOR

CROSS-REFERENCE TO RELATED APPLICATION(S)

This application claims priority to U.S. Provisional Application No. 62/277,167, filed on Jan. 11, 2016, entitled "Methods for Clocking an Image Sensor," invented by Christopher Parks, and is incorporated herein by reference and priority thereto for common subject matter is hereby claimed.

BACKGROUND

This relates generally to imaging systems, and more particularly to clocking methods for coupled device (CCD) image sensors that improve horizontal CCD transfer rates during binning and that provide better noise performance.

Electronic devices such as cellular telephones, cameras, and computers often include imaging systems that include digital image sensors for capturing images. Image sensors may be formed having a two-dimensional array of image pixels that contain photodiodes that convert incident photons (light) into electrical signals. Electronic devices often include displays for displaying captured image data.

Conventional interline CCD imagers are provided with multiple photodiodes that are formed below a pinning layer. In a conventional imager, the photodiodes are typically n-type doped regions in a semiconductor substrate. The pinning layer formed over the photodiodes is usually a p-type doped layer. The pinning layer formed over the photodiodes is conventionally coupled to ground and serves as a ground for the photodiode. The potential of the photodiode remains constant as long as the voltage provided at the pinning layer is constant, and there is no net global current flow throughout the device.

Light incident on the imager results in the accumulation of photo-generated electrons in the n-type photodiode region. Some of these photo-generated electrons are read out into a vertical CCD (VCCD) by applying a read-out voltage (sometimes referred to as the "third-level voltage") to a transfer gate that is formed over the VCCD and a region between the photodiode and the VCCD.

The "third-level voltage" conventionally used in the read-out of photo-generated charges from photodiodes to the VCCD is usually a large voltage greater than 7 V. The photo-generated electrons are then read out from each VCCD to a horizontal CCD (HCCD), where they are then stored in a floating diffusion node before being transferred to an associated output.

In some conventional CCD image sensors, binning operations are performed on charges before they are read out from the associated output. This binning is traditionally performed only at a summing gate at the output of the HCCD. This summing gate is provided with a control signal having a 75% duty cycle that is clocked at half the frequency of the HCCD. This requires the HCCD to be clocked at twice the frequency of non-binning methods in order to achieve the same output sampling frequency. This traditional binning method only allows two charges to be binned together and all charges must be binned in the summing gate. Because of the high duty cycle used in the traditional binning method, the time window during which charge is available to be sampled from the floating diffusion node (i.e., sampling window) is half the size of the corresponding sampling window of traditional non-binning CCD read out methods. This decrease in the size of the sampling window results in increased noise and requires higher bandwidth electronics that increase the cost of the system.

Accordingly, what is needed is a technique that allows charges to be binned together in a CCD image sensor while avoiding the disadvantages associated with the above-noted conventional techniques.

DETAILED DESCRIPTION

Figure 1:
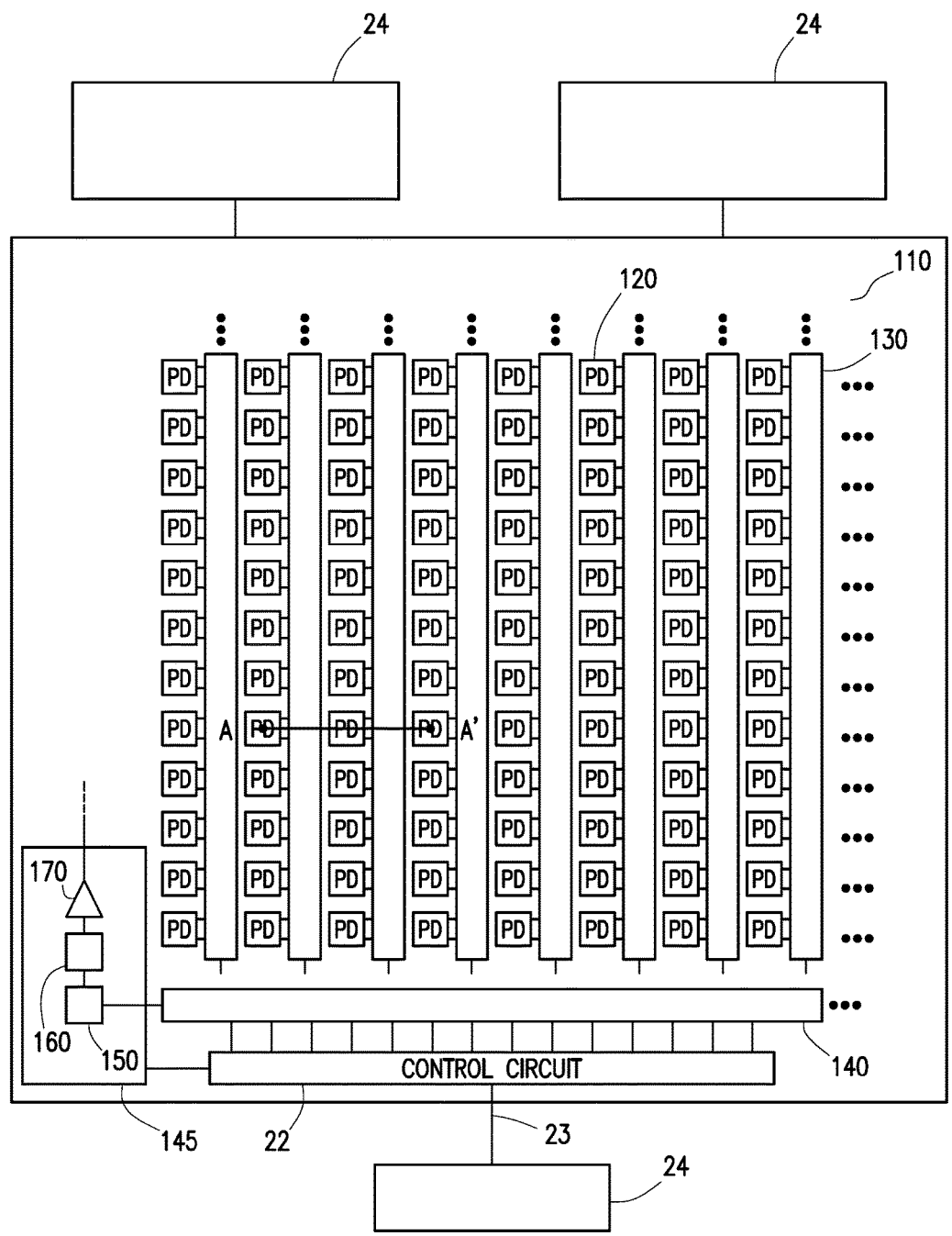
FIG. 1 is a block diagram of a CCD image sensor.

FIG. 1 is a diagram of the basic configuration of an interline charge-coupled device (CCD) image sensor 110. Image sensor 110 may integrated into a vehicle safety system (e.g., a rear-view camera or other vehicle safety system), a surveillance system, an electronic device such as a camera, a cellular telephone, a video camera, or any other desired electronic device that captures digital image data. The light gathering units may include an array of photodiodes 120 arranged in rows and columns. Photodiodes 120 may each be associated with an image pixel, and may be therefore be interchangeably referred to as "pixel photodiodes." Light filtering elements such as color filters, plasmonic light filters, resonance enhanced color filters, or any other filter elements may be formed over each of photodiodes 120. Lens elements such as microlenses may also be formed over photodiodes 120. External circuitry 24 may be used to provide signals to or receive signals from image sensor 110. For example, external circuitry 24 may be used to provide control signals to components within image sensor 110.

Each column of photodiodes 120 in image sensor 110 may be associated with a respective vertical CCD (VCCD) 130. One or more horizontal CCDs (HCCDs) 140 may also be provided in image sensor 110, and may be coupled to an output amplifier 150 that provides image pixel signals to additional image readout and processing circuitry (not shown). In a progressive scan readout mode, every photodiode 120 may simultaneously transfer some or all of the photo-generated charge collected in the photodiode during an image capture mode, to their respective VCCDs 130. As an example, some or all of the photo-generated charge from photodiodes 120 in a first column of image sensor 110 may be transferred to a first VCCD 130, while some or all of the photo-generated charge from photodiodes 120 in a second column of image sensor 110 may be transferred to a second VCCD 130 at the same time.

Charge in the VCCDs 130 may be read out by transferring all columns in parallel, one row at a time, into the HCCD 140. As an example, charge associated with every row of all the VCCDs 130 associated with every column in the image sensor may be transferred one row towards the HCCD 140. At the same time, charge associated with the first row of image sensor 110 adjacent to the HCCD 140 is transferred from VCCDs 130 to HCCD 140.

Output stage 145 may include summing gate 150, floating diffusion node 160, and output amplifier 170. Output stage 145 may include additional components (e.g., reset gate, read-out node, output gate) not shown here. Once HCCD 140 receives charge associated with a given row from VCCDs 130, the HCCD 140 may then serially transfer charge to floating diffusion node 160 through summing gate 150. During read-out, charge that has accumulated at floating diffusion node 160 may be transferred to an output amplifier 170 (sometimes referred to as a floating diffusion amplifier). To increase frame rate, the CCD image sensor may have more than one output amplifier (not shown) and each output amplifier may provide different output gains. In some instances, HCCD 140 may be duplicated at the opposite side of image sensor 110 (e.g., for multi-output read out operations). The duplicate HCCD may serve the same purpose and may have the same functionality as HCCD 140.

Control circuit 22 may be used to provide control signals (e.g., clock signals, power signals, voltage offsets, etc.) to HCCD 140 and components within output stage 145. Control circuit 22 may receive control signals over path 23 from external circuitry 24. Alternatively, control circuit 22 may be housed partially or entirely within external circuitry 24.

To transfer the charge packets, there are polysilicon gates in the VCCD 130 and HCCD 140 regions. Within a pixel, the VCCD 130 and HCCD 140 regions include of one or more polysilicon gates. Clocking the voltages on these gates between two potentials provides a means for transferring the charge in a bucket-brigade fashion.

Figure 2:
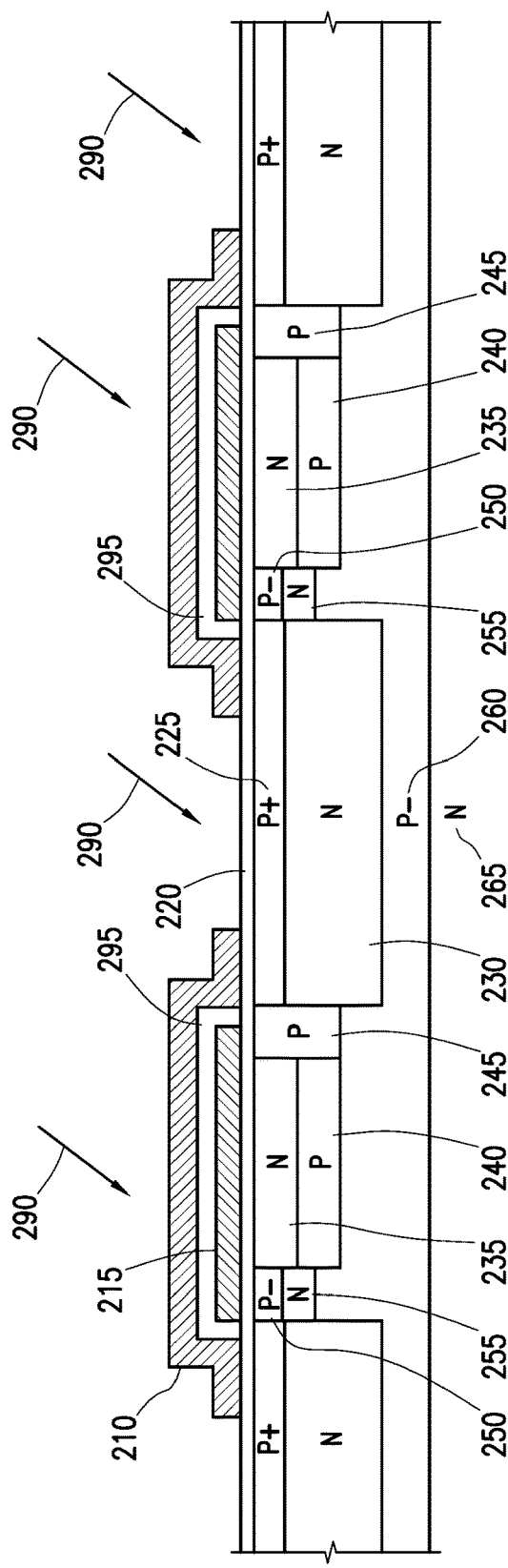
FIG. 2 is a cross-sectional side view through line A-A' in FIG. 1 of a CCD with a light-shield.

FIG. 2 is a cross-sectional side view through line A'-A" in FIG. 1 for an interline CCD such as image sensor 110. The lightshield 210 may block incident light 290 from striking the gate 215 and reaching the channel implant that defines the VCCD 235. Lightshield 210 may be formed over n-type implant 235 (sometimes referred to as "the VCCD channel 235") and may be formed at least partially over photodiode 230. Specifically, as illustrated in FIG. 2, lightshield 210 may be formed above at least a portion of pinning implant 225 that is formed above photodiode 230. Lightshield 210 may be formed over gate 215, and may be separated from gate 215 by a dielectric 295. Gate 215 may be formed at least partially over p-doped region 245 and p-implant 250.

The channel implant that defines the VCCD 235 may include p-doped regions 240 and 245. Gate dielectric 220 may electrically isolate the gate 215 from the semiconductor in which doped regions 225-260 are formed. Semiconductor substrate 265 and doped regions 225-260 may be collectively referred to as "the semiconductor." P+ pinning implant 225 may have a high enough concentration of p-type dopants to accumulate holes at the interface of dielectric 220 and the semiconductor. This hole-accumulation layer reduces dark current and establishes the ground connection to the periphery of the pixel array of image sensor 110. The P+ pinning implant 225 may be shared for pixels in a given column, and may be formed over multiple photodiodes 120 in a given column of image sensor 110.

Photo-generated electrons may be collected in the photodiode 230. The deep P− region 260 may establish a vertical overflow drain between the photodiode 230 and the N substrate 265. In bright light situations, the excess charge carriers from the photodiode 230 may flow into the substrate instead of blooming into the VCCD channel 235. The P-type implants 240 and 245 may provide isolation between the VCCD channel 235 and the photodiode 230. The P− implant 250 and N implant 255 may set the transfer gate potential between the photodiode 230 and VCCD channel 235.

Photogenerated electrons that are collected in the photodiode 230 are transferred to the VCCD channel 235 by applying a positive voltage on the gate 215. For an interline CCD this voltage is typically greater than 7 V.

Figure 3:
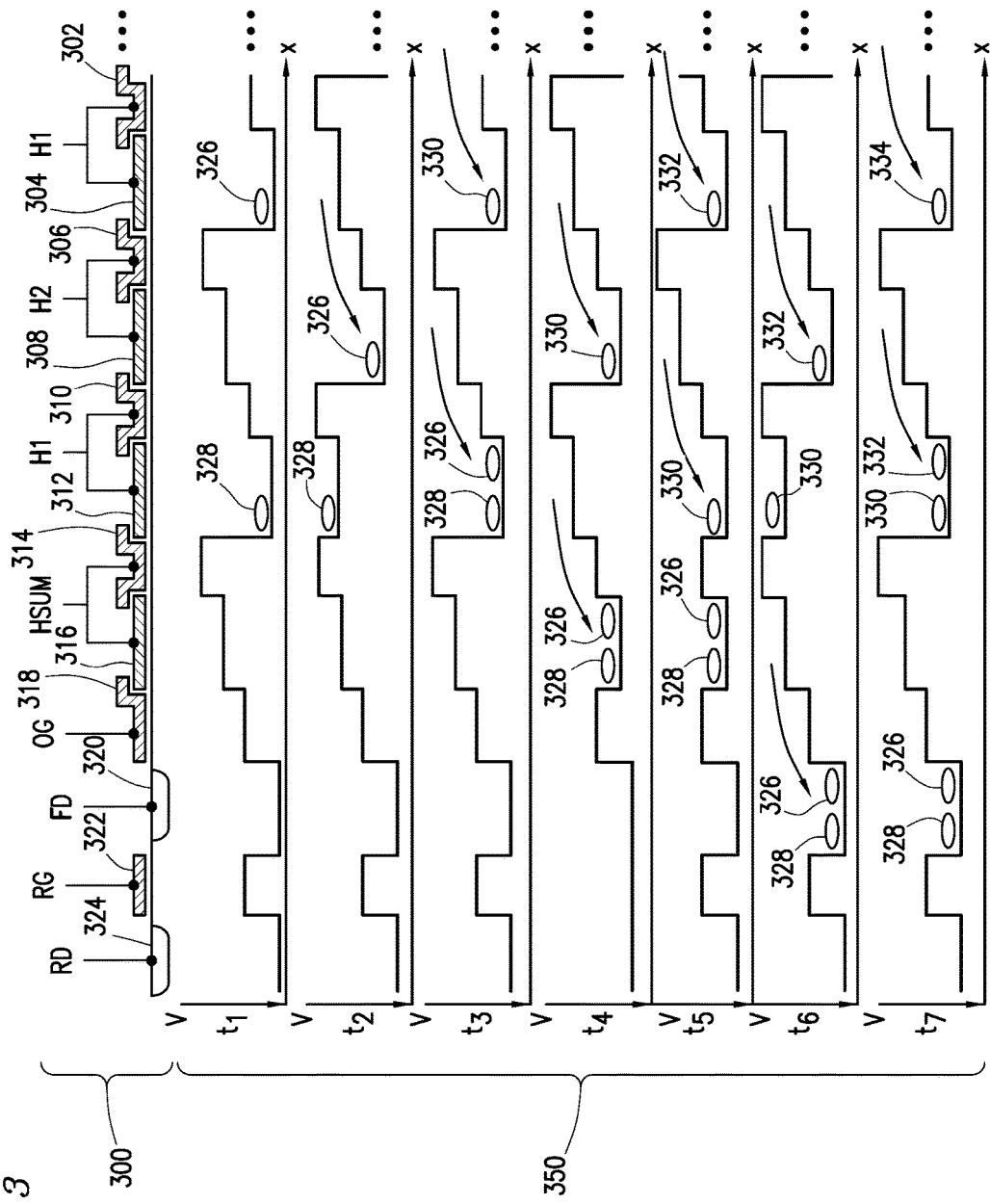
FIG. 3 is an illustrative diagram and cross-section that shows a method for passing charges through an HCCD in a CCD image sensor and the associated output of the HCCD during binning operations, where a summing gate is clocked at a 50% duty cycle at half the frequency of the HCCD clocking frequency in accordance with an embodiment.

FIG. 3 is a diagram that shows a method for passing charges through a CCD image sensor at HCCD and output stages during binning operations. Specifically, FIG. 3 shows a method for binning together every two adjacent charges on an HCCD of a CCD image sensor during HCCD read out. Cross-section 300 shows a cross-sectional view of an HCCD and an output stage (e.g., HCCD 140 and output stage 145 in FIG. 1). As shown in cross-section 300, gates 302, 304, 306, 308, 310, and 312 may be part of an HCCD (e.g., HCCD 140 in FIG. 1) and may pass charge in a bucket-brigade fashion to summing gate 316 through gate 314. Output gate 318 may be interposed between summing gate 316 and floating diffusion node 320. Floating diffusion node 320 may be interposed between output gate 318 and reset gate 322. Floating diffusion node 320 may receive charge from summing gate 316 over output gate 318. Reset gate 322 may be interposed between floating diffusion 320 and reset drain 324. Floating diffusion node 320 may be coupled to an output amplifier (e.g., output amplifier 170 in FIG. 1). The output amplifier may, for example, be a floating diffusion amplifier, a floating gate amplifier, or any other type of charge sensing amplifier.

Gates 302, 304, 310, and 312 may receive control signal H1 (sometimes referred to herein as clock signal H1). Gates 306 and 308 may receive control signal H2 (sometimes referred to herein as clock signal H2). Signals H1 and H2 may be complimentary clock signals (e.g., when signal H1 is high, signal H2 is low and vice-versa) such that a bucket-brigade style of charge transfer is achieved. Gate 314 and summing gate 316 may receive control signal HSUM (sometimes referred to herein as clock signal HSUM). Output gate 318 may receive control signal OG or may instead be optionally set to a static potential value during gate fabrication. Voltage at floating diffusion node 320 may be represented by signal FD. Reset gate 322 may receive control signal RG. Reset drain node 324 may be set to a static potential.

Diagram 350 shows the energy levels (V) with respect to position (x) along cross-section 300 at various times during the read out process. At time $t_1$, charges 326 and 328 may be provided to gates 304 and 312, respectively, while signal H1 is held at a high voltage to set gates 302, 304, 310 and 312 at a high potential, and while signals H2 and HSUM are held at a low voltage to set gates 308, 306, 314, and summing gate 316 at a low potential. Time $t_1$ may correspond to the horizontal retrace period (i.e., line transfer period) of the CCD image sensor. It should be noted that whenever signals HSUM, H1, H2, and RG are at a high voltage level, their corresponding gates are at a high potential, and vice-versa. Other charges may be provided to additional gates along the HCCD that are not shown in FIG. 3. At time $t_2$, signal H2 may be held high while signals H1 and HSUM are held low such that charge 326 is passed from gate 304 to gate 308 through gate 306. At time $t_3$, signal H1 may be held high while signals H2 and HSUM are held low such that charge 326 may be passed from gate 308 to gate 312 through gate 310, thereby binning charges 326 and 328. Also at time $t_3$, charge 330 may be passed to gate 304 through gate 302 from an adjacent HCCD gate (not shown). At time $t_4$, signal H1 may be held low and signals H2 and HSUM may be held high such that charges 328 and 326 are passed from gate 312 to summing gate 316 through gate 314, and such that charge 330 may be passed from gate 304 to gate 308 through gate 306. Also at time $t_4$, signal RG may be pulsed high directly after the clock transition such that any charge on floating diffusion node 320 is transferred to reset drain node 324 through reset gate 322 (i.e., such that charge on the floating diffusion node is removed and the floating diffusion node reset to the reset drain voltage). At time $t_5$, signal H2 may be held low while signals H1 and HSUM are held high, such that charge 330 is passed from gate 308 to gate 312 through gate 310. Also at time $t_5$, charge 332 may be passed to gate 304 through gate 302 from the adjacent HCCD gate. At time $t_6$, signal H2 may be held high while signals H1 and HSUM are held low such that charges 326 and 328 are passed to floating diffusion node 320 over output gate 318. Also at time $t_6$, charge 332 may be passed from gate 304 to gate 308 through gate 306. At time $t_7$, signal H1 may be held high while signals H2 and HSUM are held low such that charge 332 is passed from gate 308 to gate 312 through gate 310, thereby binning charges 330 and 332. Also at time $t_7$, charge 334 may be passed to gate 304 through gate 302 from the adjacent HCCD pixel. It should be noted that charges described here are actually moving in the silicon region below the gates, and are not moving through the gates themselves. This process of charge transfer and binning may be repeated in the fashion described above until every charge on the HCCD has been read out, at which point additional charges may be fed into the HCCD from the VCCDs.

Figure 4:
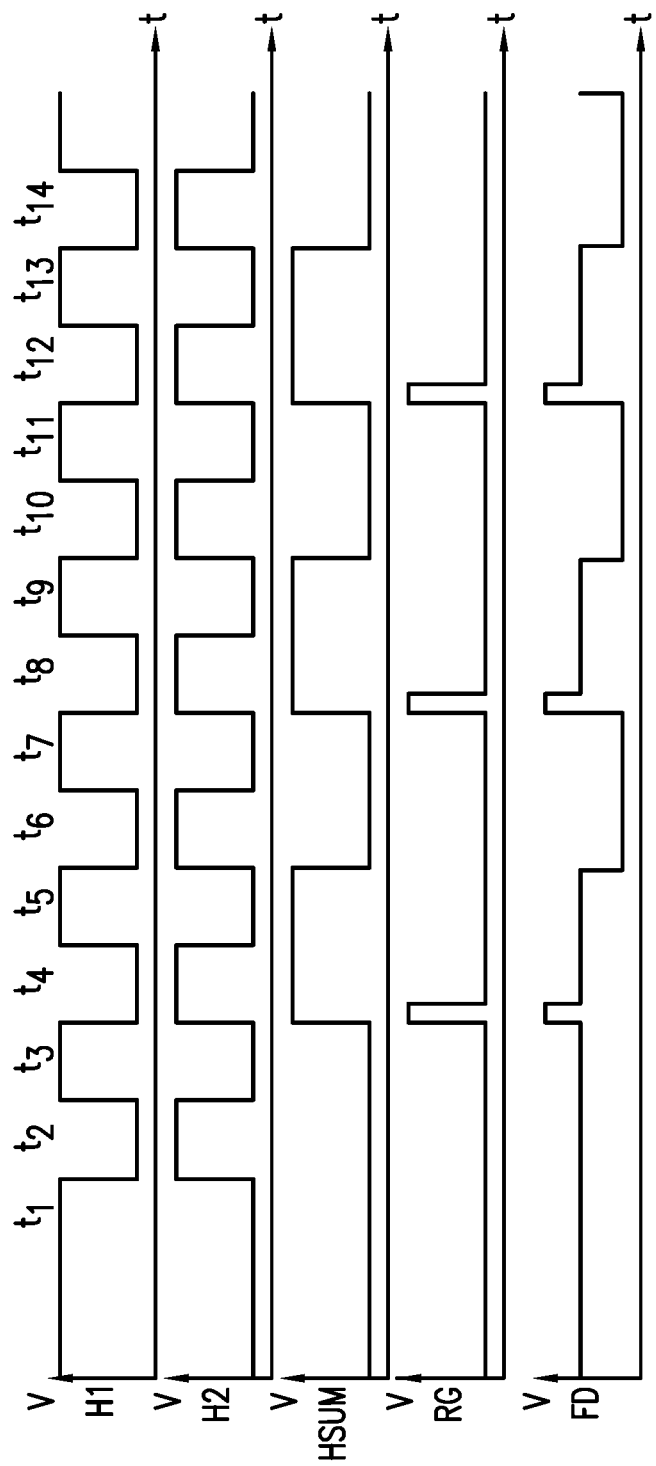
FIG. 4 is an illustrative timing diagram that corresponds to the diagram in FIG. 3 in accordance with an embodiment.

FIG. 4 is a timing diagram showing voltage (V) with respect to time (t) for the signals H1, H2, HSUM, RG, and FD in connection with cross-section 300 and diagram 350 of FIG. 3. As shown in FIG. 4, signals H1 and H2 may be complementary signals that constantly alternate from high to low. Signal HSUM may have a 50% duty cycle and may have a frequency that is half of the frequency of signals H1 and H2. Signal RG may be pulsed at the beginning of every fourth time period (e.g., at times $t_4$, $t_8$, $t_{12}$) to remove charges from the floating diffusion node 320 by transferring the charges to reset drain 324 through reset gate 322. When charges are present on floating diffusion node 320 (e.g., at times $t_6$, $t_7$, $t_{10}$, $t_{11}$, etc.), signal FD may be at a low voltage level. When charges are not present on floating diffusion node 320 (e.g., at time $t_5$), signal FD may be at an intermediate voltage level. When the reset gate 322 is pulsed high there is a corresponding capacitive feed-through pulse on floating diffusion node 320. As shown in FIG. 4, the timing of signals H1, H2, HSUM, and RG may be repeated every four time periods until every charge on the HCCD has been read out. For example, the timing of signals H1, H2, HSUM, and RG from times $t_4$-$t_7$ may be the same as the timing of signals H1, H2, HSUM and RG from times $t_8$-$t_{11}$.

Figure 5:
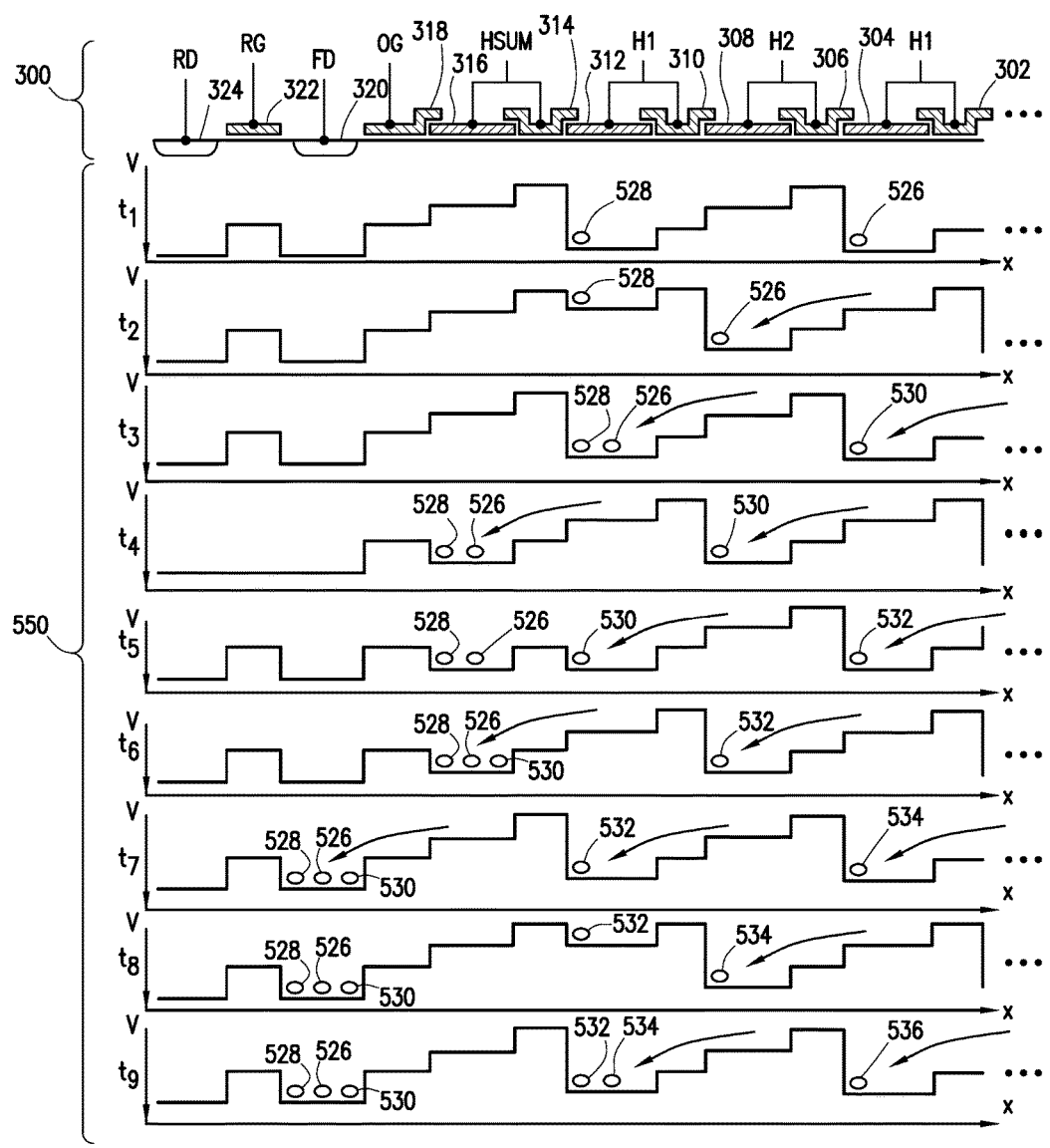
FIG. 5 is an illustrative diagram and cross-section that shows a method for passing charges through an HCCD in a CCD image sensor and the through associated output of the HCCD during binning operations, where the summing gate is clocked at a 50% duty cycle at one-third of the frequency of the HCCD clocking frequency in accordance with an embodiment.

FIG. 5 is a diagram that shows another method for passing charges through a CCD image sensor at HCCD and output stages during binning operations. Specifically, embodiment shown in FIG. 5 provides a method for binning together every three adjacent charges on an HCCD of a CCD image sensor during HCCD read out.

Diagram 550 shows the energy levels (V) with respect to position (x) along cross-section 500 at various times during the read out process. At time $t_1$, charges 526 and 528 may be provided to gates 304 and 312, respectively, while signal H1 is held high and while signals H2 and HSUM are held low. Time $t_1$ may correspond to the horizontal retrace period (i.e., line transfer period) of the CCD image sensor. Other charges may be provided to additional gates along the HCCD that are not shown in FIG. 5. At time $t_2$, signal H2 may be held high while signals H1 and HSUM are held low such that charge 526 is passed from gate 304 to gate 308 through gate 306. At time $t_3$, signal H1 may be held high while signals H2 and HSUM are held low such that charge 526 may be passed from gate 308 to gate 312 through gate 310, thereby binning charges 526 and 528. Also at time $t_3$, charge 530 may be passed to gate 304 through gate 302 from an adjacent HCCD gate (not shown). At time $t_4$, signal H1 may be held low and signals H2 and HSUM may be held high such that charges 528 and 526 are passed from gate 312 to summing gate 316 through gate 314, and such that charge 530 may be passed from gate 304 to gate 308 through gate 306. Also at time $t_4$, signal RG may be pulsed high directly after the clock transition such that any charge on floating diffusion node 320 is transferred to reset drain node 324 through reset gate 322 (i.e., such that charge removed and the floating diffusion node reset to the reset drain voltage). At time $t_5$, signal H2 may be held low while signals H1 and HSUM are held high, such that charge 530 is passed from gate 308 to gate 312 through gate 310. Also at time $t_5$, charge 532 may be passed to gate 304 through gate 302 from the adjacent HCCD gate. At time $t_6$, signal H1 may be held low while signals H2 and HSUM are held high such that charge 530 is passed from gate 312 to summing gate 316 through gate 314, thus binning charge 530 with charges 528 and 526. Also at time $t_6$, charge 532 may be passed from gate 304 to gate 308 through gate 306. At time $t_7$, signal H1 may be held high while signals H2 and HSUM are held low such that charges 526, 528, and 530 are passed from summing gate 316 to floating diffusion node 320 through output gate 318. Also at time $t_7$, charge 532 may be passed from gate 308 to gate 312 through gate 310, and charge 534 may be passed to gate 304 through gate 302 from the adjacent HCCD pixel. At time $t_8$, signal H2 may be held high while signals H1 and HSUM are held low such that charge 534 is passed from gate 304 to gate 308 through gate 306. At time $t_9$, signal H1 may be held high while signals H2 and HSUM are held low such that charge 534 is passed from gate 308 to gate 312 through gate 310. Also at time $t_9$, charge 536 may be passed to gate 304 through gate 302 from the adjacent HCCD gate. It should be noted that charges described here are actually moving in the silicon region below the gates, and are not moving through the gates themselves. This process of charge transfer and binning may be repeated in the fashion described above until every charge on the HCCD has been read out, at which point additional charges may be fed into the HCCD from the VCCDs.

Figure 6:
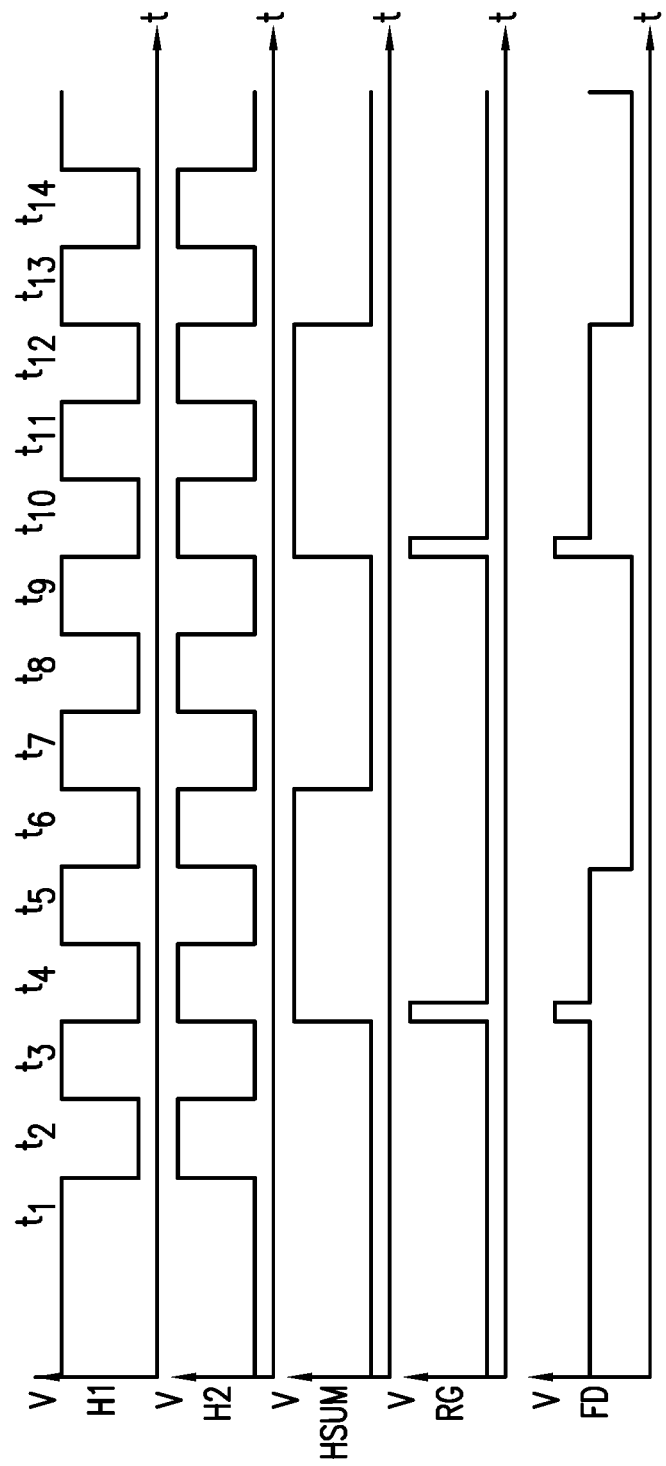
FIG. 6 is an illustrative timing diagram that corresponds to the diagram in FIG. 5 in accordance with an embodiment.

FIG. 6 is a timing diagram showing voltage (V) with respect to time (t) for the signals H1, H2, HSUM, RG, and FD in connection with cross-section 300 and diagram 350 of FIG. 5. As shown in FIG. 6, signals H1 and H2 may be complementary signals that constantly alternate from high to low. Signal HSUM may have a 50% duty cycle and may have a frequency that is one-third of the frequency of signals H1 and H2. Signal RG may be pulsed at the beginning of every sixth time period starting at time $t_4$ (e.g., at times $t_4$, $t_{10}$, $t_{16}$) to remove charges on floating diffusion node 320 to reset drain node 324 through reset gate 322. When charges are present on floating diffusion node 320 (e.g., at times $t_7$, $t_8$, $t_9$, $t_{13}$, $t_{14}$, $t_{15}$, etc.), signal FD may be at a low voltage level. When charges are not present on floating diffusion node 320 (e.g., at time $t_5$), signal FD may be at an intermediate voltage level. When the reset gate 322 is pulsed high there is a corresponding capacitive feed through pulse on floating diffusion node 320. The timing of signals H1, H2, HSUM, and RG may be repeated every six time periods until every charge on the HCCD has been read out. For example, the timing of signals H1, H2, HSUM, and RG from times $t_4$-$t_9$ may be the same as the timing of signals H1, H2, HSUM and RG from times $t_{10}$-$t_{15}$.

The binning methods of FIGS. 3-6 may be used in monochrome CCD image sensors to improve image detection in low light conditions. Alternatively, these binning methods may be used in color CCD image sensors in low light conditions. For example, four signals from a single Bayer filter unit cell in a color CCD image sensor may be binned together to create a single monochrome signal when very low light signals are detected, thus allowing a user to selectively image in a monochrome mode. It should be noted that the binning methods of FIGS. 3-6 are not limited to interline CCD image sensors, but may also be used in full frame transfer CCD image sensors, linear CCD image sensors, time-delay integration CCD image sensors, or any other compatible CCD image sensor.

The limiting factor for CCD read-out frequency for current CCD technology is the ability to transfer charge over output gate 318 and the slew rate of the output amplifier. Thus, the frequency of clock signal HSUM should be constant (e.g., 20 MHz) while the frequency of clock signals H1 and H2 may be adjusted as a multiple of the HSUM clock frequency based on the desired number of adjacent charges to be binned together. The number of adjacent charges binned together may correspond to which multiple of the HSUM clock frequency that the H1/H2 clock frequency is set to. For example, in the embodiment of FIGS. 3 and 4, the H1/H2 clock frequency may be twice the HSUM clock frequency such that every two adjacent charges are binned together before read out. Binning may occur at gate 312 when the H1/H2 clock frequency is twice the HSUM clock frequency. In the embodiment of FIGS. 5 and 6, the H1/H2 clock frequency may be three times the HSUM clock frequency such that every three adjacent charges are binned together before read out. Binning may occur at summing gate 316 when the H1/H2 clock frequency is more than twice the HSUM clock frequency. If desired, the H1/H2 clock frequency may be set to any multiple of the HSUM clock frequency within the operating frequency range of the HCCD.

Various embodiments have been described illustrating methods and apparatus for binning charges in a CCD image sensor. A method for binning charges in a charge coupled device (CCD) image sensor may include providing a first HCCD control signal to a first subset of elements within the HCCD with a control circuit where the first HCCD control signal has a first frequency, providing a second HCCD control signal to a second subset of the elements within the HCCD with the control circuit where the second HCCD control signal has the first frequency, and providing a summing control signal to a summing element in an output stage of the CCD with the control circuit where the summing control signal has a second frequency with a substantially 50 percent duty cycle and where the first frequency is a multiple of the second frequency. The second HCCD control signal may be 180 degrees out of phase with the first HCCD control signal. Each element in the first and second subsets of elements may include an a gate. Each element of the second subset of elements may be interposed between elements of the second subset of elements. The summing element may be coupled to the HCCD. The summing element may include a summing. The summing gate may be coupled to a floating diffusion node through an output gate. The floating diffusion node may be coupled to a floating diffusion amplifier.

In some embodiments, the first frequency may be twice the second frequency. The method may further include binning chares together at an element of the HCCD that is adjacent to the summing element.

In some embodiments, the first frequency may be three times the second frequency. The method may further include binning charges together at the summing gate of the summing element.

A method for binning charges in a charge coupled device (CCD) image sensor having a horizontal CCD (HCCD) may include providing a first clock signal to a first group of elements of the HCCD with a control circuit where the first clock signal oscillates at a first frequency, providing a second clock signal to a second group of elements of the HCCD with the control circuit where the second clock signal oscillates at the first frequency and where the first and second clock signals are complimentary signals, and providing a summing clock signal to a summing element with the control circuit, where the summing clock signal oscillates at a second frequency that is different than the first frequency and where the summing clock signal has a substantially 50% duty cycle. The first frequency may be a multiple of the second frequency. The method may further include binning a number of adjacent charges together in the CCD image sensor where the number of adjacent charges that are binned together depends on the ratio between the first frequency and the second frequency, and reading out the binned charges through an amplifier.

In some embodiments, the first frequency may be twice the second frequency. Binning the number of adjacent charges together may further include binning every two adjacent charges together at the HCCD.

In some embodiments, the first frequency may be three times the second frequency. Binning the number of adjacent charges together may further include binning every three adjacent charges together at the summing element.

A charge coupled device (CCD) image sensor may include a horizontal CCD (HCCD), an output stage coupled to the HCCD, and a control circuit coupled both to the HCCD and to the output stage where the control circuit may be configured to provide first and second complementary control signals to the HCCD at a first frequency, and to provide a summing signal to the output stage at a second frequency. The first frequency may be a multiple of the second frequency. The output stage may include a summing element that receives the summing signal from the control circuit and that is coupled to the HCCD, an output gate that is coupled to the summing element, a floating diffusion node where the output gate is coupled between the summing element and the floating diffusion node, a reset gate coupled to the floating diffusion node, and a floating gate amplifier coupled to a floating diffusion node.

In some embodiments, the first frequency may be twice the second frequency. Every two adjacent charges in the HCCD may be binned together within the HCCD before being read out.

In some embodiments, the first frequency may be three times the second frequency. Every three adjacent charges in the HCCD may be binned together within the summing element before being read out.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for binning charges in a charge coupled device (CCD) image sensor comprising:
   with a horizontal CCD (HCCD), receiving charges from an array of vertical CCDs (VCCDs);
   with a control circuit, providing a first HCCD control signal to a first subset of elements within the HCCD, wherein the first HCCD control signal has a first frequency;
   with the control circuit, providing a second HCCD control signal to a second subset of elements within the HCCD, and wherein the second HCCD control signal has the first frequency;
   in response to receiving the second HCCD control signal, binning charges from first and second photosensitive elements coupled to the array of VCCDs using one of the second subset of elements within the HCCD;
   with the control circuit, providing a summing control signal to a summing element in an output stage of the CCD, wherein the summing control signal has a second frequency with a 50 percent duty cycle, and wherein the first frequency is three times the second frequency;
   in response to receiving the summing control signal, adding charges from a third photosensitive element coupled to the array of VCCDs to the binned charges from the first and second photosensitive elements using the summing element; and
   transferring only the charges from the first, second, and third photosensitive elements from the summing element to a floating diffusion node before receiving additional charges at the summing element.

2. The method defined in claim 1, wherein the second HCCD control signal is 180 degrees out of phase with the first HCCD control signal.

3. The method defined in claim 2, wherein each element in the first and second subsets of elements comprises a gate, and wherein elements of the first subset of elements are interposed between elements of the second subset of elements in an alternating pattern.

4. The method defined in claim 3, wherein the summing element is coupled to the HCCD.

5. The method defined in claim 4, wherein the summing element comprises a summing gate.

6. The method defined in claim 5, wherein the summing gate is coupled to the floating diffusion node through an output gate.

7. The method defined in claim 6, wherein the floating diffusion node is coupled to a floating diffusion amplifier.

8. The method defined in claim 7 further comprising:
   binning charges together at an element of the HCCD that is adjacent to the summing element.

9. The method defined in claim 8 further comprising:
   binning charges together at the summing gate of the summing element.

10. A method for binning charges in a charge coupled device (CCD) image sensor having a horizontal CCD (HCCD) and an array of photosensitive elements, the method comprising:
    with a control circuit, providing a first clock signal to a first group of elements of the HCCD, wherein the first clock signal oscillates at a first frequency;
    with the control circuit, providing a second clock signal to a second group of elements of the HCCD, wherein the second clock signal oscillates at the first frequency, and wherein the first and second clock signals are complimentary signals;
    in response to receiving the second clock signal, combining charges from first and second photosensitive elements of the array of photosensitive elements using one of the second group of elements of the HCCD;
    with the control circuit, providing a summing clock signal to a summing element, wherein the summing clock signal oscillates at a second frequency that is different than the first frequency, and wherein the summing clock signal has a 50% duty cycle;
    in response to receiving the summing clock signal, combining charges from a third photosensitive element of the array of photosensitive elements with the combined charges from the first and second photosensitive elements using the summing element; and
    transferring only the charges from the first, second, and third photosensitive elements from the summing element to a floating diffusion node before receiving additional charges at the summing element.

11. The method defined in claim 10, wherein the first frequency is three times the second frequency, and wherein binning the number of adjacent charges together further comprises:
    binning every three adjacent charges together at the summing element.

12. A charge coupled device (CCD) image sensor comprising:
    an array of photosensitive elements;
    a horizontal CCD (HCCD);
    an output stage coupled to the HCCD; and
    a control circuit coupled to the HCCD and to the output stage, wherein the control circuit is configured to provide first and second complementary control signals to the HCCD at a first frequency, and to provide a summing signal with a 50 percent duty cycle to a summing element at a second frequency, wherein the HCCD combines charges from three selected photosensitive elements of the array of photosensitive elements in response to receiving the summing signal before transferring the combined charges from only the three selected photosensitive elements from the summing element to a floating diffusion node before receiving additional charges at the summing element, and wherein the first frequency is three times the second frequency.

13. The apparatus defined in claim 12, wherein the output stage comprises:
    an output gate that is coupled to the summing element, wherein the output gate is coupled between the summing element and the floating diffusion node;
    a reset gate coupled to the floating diffusion node; and
    a floating diffusion amplifier coupled to a floating diffusion node.

* * * * *